United States Patent Office 3,839,342
Patented Oct. 1, 1974

3,839,342
SUBSTITUTED 1,3,8-TRIAZASPIRO[4.5]DECANES
William George Scharpf, Pasadena, Md., assignor to
FMC Corporation, New York, N.Y.
No Drawing. Filed Sept. 27, 1968, Ser. No. 763,416
Int. Cl. C07d 29/18, 29/20
U.S. Cl. 260—293.66          5 Claims

ABSTRACT OF THE DISCLOSURE 1,3,8-Triazaspiro[4.5]decanes containing a carbamoyl or thiocarbamoyl function at the 3-position, exhibit pronounced neuroleptic activity. The compounds are prepared by reacting the requisite 3-unsubstituted 1,3,8-triazaspiro [4.5]decane with the corresponding carbamoyl halide in the presence of a strong base.

BACKGROUND OF THE INVENTION

A. Field of the Invention

This invention relates to neuroleptically active 1,3,8-triazaspiro[4.5]decanes, particularly those having a carbamoyl or thiocarbamoyl group in the 3-position. The invention also pertains to the preparation of the aforenamed compounds and to pharmaceutical compositions containing them.

B. Description of the Prior Art 1,3,8-Triazaspiro[4.5]decane is the class name applied to the organic ring system

I.

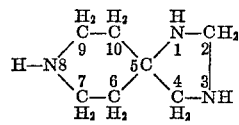

It is known only in the form of various derivatives. These are prepared by reacting a 4-piperidone or an alkali metal 4 - hydroxypiperidine - 4 - sulfonate wherein the piperidyl nitrogen is protected by, for instance, a benzyl group; with a primary amine and an alkali metal cyanide whereby there is introduced into the 4-position of the piperidine ring, a nitrile and secondary amino group. The reaction is commonly conducted in an aqueous alcohol system in the presence of one equivalent of hydrochloric acid or in an aqueous organic carboxylic acid system such as acetic acid. The resulting product is then treated with a strong mineral acid such as hydrochloric acid, phosphoric acid or preferably sulfuric acid to effect hydrolysis of the cyano group to the corresponding amine function. The resulting carboxamidopiperidine is condensed with formamide in the presence of an inorganic acid such as sulfuric acid to bring about cyclization to the 2,4,8 - triazaspiro[4.5]decane. Where the cyclization is carried out with an intermediate in which the secondary amino group is alkylamino, one commonly ends up with a corresponding 1,3,8-triazaspiro [4.5]dec-2-ene; an arylamino group, on the other hand, results in the saturated 1,3,8-triazaspiro[4.5]decane. The decene can be reduced to the decane by typical reduction procedures and materials, and in this connection lithium aluminum hydride or sodium aluminum hydride are both effective and convenient reducing agents. Another method for ring closing the carboxamidopiperidine is to treat it with an acylating agent, particularly an anhydride of an aliphatic carboxylic acid of low molecular weight. This procedure results in the unsaturated 1,3,8 - triazaspiro [4.5]dec-2-ene having in the 1-position thereof, a substituent identical to the aliphatic carboxylic acid residue of the particular anhydride employed.

A benzyl group may be used to protect the piperidyl nitrogen during the early stages of the synthesis and later can be removed and replaced by other substituents. For further details on the synthesis of 4-oxo-1,3,8-triazaspiro [4.5]decanes, the technical and chemical literature should be consulted, and in this connection reference is made to U.S. Pat. 3,155,670 to Janssen and J. Org. Chem., 26, 4480 (1961).

An interesting class of 1,3,8-triazaspiro[4.5]decanes is described in the aforementioned U.S. patent to Janssen. These compounds, which exhibit neuroleptic activity are 4 - oxo - 1,3,8 - triazaspiro[4.5]decanes having attached to the 1 and 8 positions, respectively, a hydrocarbon group and a benzoylalkyl group. In some instances the 3-position carries a lower alkyl or acyl moiety. The configuration of the Janssen compounds is more readily visualized by reference to the following general formula:

II.

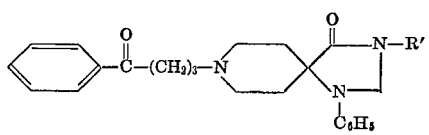

wherein R' represents hydrogen or lower alkyl.

A class of 1,3,8-triazaspiro[4.5]decanes having even more pronounced neuroleptic activity are disclosed and claimed in pending application Ser. No. 556,854, filed June 13, 1966, in the name of William G. Scharpf. These compounds are ketals of 8 - (3 - aroylpropyl)-4-oxo-1-phenyl - 1,3,8 - triazaspiro[4.5]decanes having a lower aliphatic hydrocarbon group located on the 3-position.

SUMMARY OF THE INVENTION

We have now discovered a further new class of 1,3,8-triazaspiro[4.5]decanes which are neuroleptically active, characterized by the presence of a 3-carbamoyl function and having the following formula:

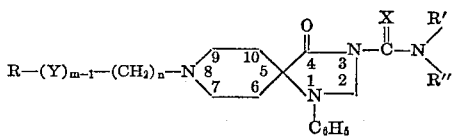

wherein R' and R", which may be alike or different, represent alkyl hydrocarbon groups of 1 to 2 carbon atoms; X is a chalcogen as represented by oxygen or sulfur; n is an integer of from 0 to 3; m is an integer of from 1 to 2; Y is an aliphatic divalent radical as represented by >C=O, —S— and

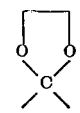

R is 4-fluorophenyl, 2-thienyl, phenyl, ethynyl and

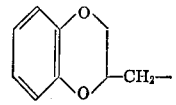

DESCRIPTION OF THE INVENTION AND THE PREFERRED EMBODIMENTS

The compounds of the invention are realized by a two-step synthesis wherein the carbamoyl function is introduced into the 3-position of the 4-oxo-1-phenyl-1,3,8-triazaspiro[4.5]decane in which the nitrogen atom in the 8-position is protected by benzyl substitution and subsequent hydrogenolysis to remove the benzyl group followed by realkylation of the free 8-position with the appropriate alkyl halide. These steps can be conducted also in reverse order in which case the carbamoyl substituent is introduced after alkylation. The following equations summarize the course of these reactions wherein the alkylation step is carried out as the last step:

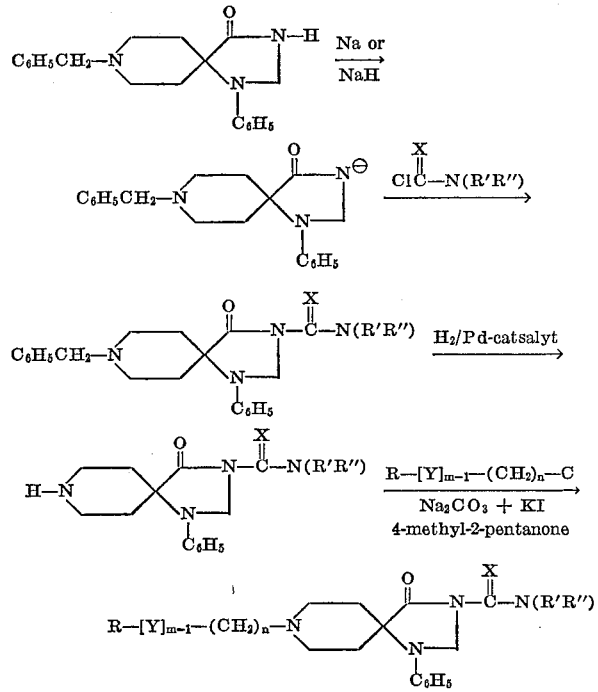

wherein R, R', R", X, Y, n and m have the values previously assigned.

In preparing the compounds herein, generally satisfactory results are attained by reacting the 8-benzyl-4-oxo-1-phenyl-1,3,8-triazaspiro[4.5]decane with a strong base or an alkali metal and the resulting anion condensed with a lower dialkylcarbamoyl halide in order to introduce the lower dialkylcarbamoyl function in the 3-position. Examples of strong bases are the alkali metal hydrides, preferably sodium hydride; sodium is the desired alkali metal. The reaction is preferably performed in a solvent of the normally liquid, relatively inert organic type such as the liquid saturated aliphatic or aromatic hydrocarbons, particularly benzene or toluene.

The resulting 8-benzyl-3-lower dialkylcarbamoyl-4-oxo-1-phenyl-1,3,8-triazaspiro[4.5]decane is subjected to hydrogenolysis to effect removal of the protecting benzyl group. Hydrogenolysis is preferably carried out using a reductive catalyst such as Raney nickel or palladium in the presence of a non-interfering solvent of which the saturated aliphatic alcohols, e.g., ethanol, are especially suitable and convenient.

The debenzylated 1,3,8-triazaspiro[4.5]decane is then alkylated with the appropriate alkyl halide to effect introduction of the desired substituent on the piperidine nitrogen atom at the 8-position. The alkylation is of general scope and applicability and is readily performed by heating, at mildly elevated temperatures, essentially stoichiometric amounts of the reactants and base in the presence of a normally liquid organic solvent; temperatures range from about room temperature to about 250° C. Generally speaking, excellent results are achieved by refluxing a mixture of solvent and reactants for a period of from a few minutes to about three hours. A trace of an alkali metal iodide, e.g., sodium or potassium iodide, facilitates the reaction. Examples of suitable bases include both mineral and organic types as exemplified by tertiary organic amines such as pyridine, quinoline, triethylamine, triethylenediamine, trimethylamine, and the like, while typical mineral bases are represented by the alkali metal carbonates of which sodium or potassium carbonate is most convenient and preferable. Isolation and purification of the final product is effected by the usual organic techniques such as crystallization, sublimation, and the like.

For the most part, the alkyl halide intermediates comprises a class of known chemical entities, the description and preparation of which are given in the technical literature. Where a particular member has not been previously disclosed, it is obtained by synthetic procedures used in preparing known analogous derivatives. For instance, the ketal-containing alkyl halide is formed using a procedure patterned after the reaction disclosed in Ber., 40, 3903 (1907) and Ber., 72, 600 (1939). Such materials are produced by reacting the requisite ketone with the appropriate alcohol or glycol in the presence of p-toluenesulfonic acid or other acidic material and isolating the resultant ketal. Further details on the preparation of these compounds can be obtained by consulting the aforesaid references. As a general source for information on these alkyl halides, mention is hereby made of "Chemical Abstracts" which is published by the American Chemical Society.

The 1,3,8-triazaspiro[4.5]decanes herein are pharmacologically active substances, being particularly effective as neuroleptics. They comprise a class of powerful medicaments of the tranquilizer type useful in treating various mental and central nervous system disorders.

As can be seen from their formulae the compounds of this invention are organic bases and as such form pharmaceutically acceptable salts with a variety of inorganic and strong organic acids including sulfuric, phosphoric, hydrochloric, hydrobromic, hydroiodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, penethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide, and crotyl bromide.

As those skilled in the art are aware, pharmaceutically active organic bases are commonly administered to the subject organism as an isotonic solution of their acid addition salts of the type above enunciated. The active bases or their addition salts can be administered to the subject animal in combination with any of the carriers or solvents known in the art for this purpose.

The invention is illustrated in greater detail by the following non-limiting examples.

Example 1.—3 - (Dimethylcarbamoyl) - 8-[3-(2-p-fluorophenyl - 2 - dioxolanyl) - propyl]-4-oxo-1-phenyl-1,3,8-triazaspiro[4,5]decane Hydrochloride A mixture of 3.0 g. (0.0067 mole) of 8-[3-(2-p-fluorophenyl - 2 - dioxolanyl)n - propyl]-4-oxo-1-phenyl-1,3,8-triazaspiro[4.5]decane, 0.32 g. (0.0068 mole) of 50% sodium dispersed in paraffin, and 25 ml. of benzene was stirred and heated at reflux temperature under a nitrogen atmosphere for two hours. The stirred mixture was cooled to 25° C., treated with a solution of 0.75 g. (0.0068 mole) of dimethylcarbamoyl chloride in 10 ml. of benzene during 15 minutes, heated at reflux temperature for one hour, and allowed to stand at room temperature overnight. The resultant slurry was diluted with 20 ml. of benzene, washed with two 25 ml. portions of water, dried over magnesium sulfate, filtered, and concentrated in vacuo. There was obtained 2.7 g. of the free base as a syrup which was dissolved in 35 ml. of benzene and treated with dry hydrogen chloride to give 0.8 g. of solid, m.p. 209–216° C. This was crystallized from 40 ml. of isopropanol to give 0.3 g. of product, m.p. 223–5° C. Infrared analysis was consistent with the structure.

The requisite 8 - [3-(2-p-fluorophenyl-2-dioxolanyl)propyl - 4 - oxo-1-phenyl-1,3,8-triazaspiro[4.5]decane was prepared by refluxing with stirring a mixture of 16.9 g. (0.073 mole) of 4 - oxo - 1 - phenyl-1,3,8-triazaspiro[4.5]decane, 20.4 g. (0.073 mole) of 2-(3-chloropropyl)-2-(4-fluorophenyl)dioxolane, 18.6 g. (0.175 mole) of sodium carbonate, 0.5 g. of potassium iodide, and 270 ml. of 4-methyl-2-pentanone for 42 hours. The mixture was cooled, washed with 200 ml. of water, dried with magnesium sulfate, filtered and concentrated in vacuum to give 35.7 g. of oil which solidified on standing. The crude product was crystallized first from isopropanol, then methylcyclohexane, then hexane to give a final product of m.p. 157–8° C.

Example 2.—3 - (Dimethylcarbamoyl) - 8-[3-(2-p-fluorophenyl - 2 - dioxolanyl)-propyl]-4-oxo-1-phenyl-1,3,8-triazaspiro[4.5]decane Oxalate The procedure of Example 1 was repeated except the syrup was dissolved in ether and the solution added to a solution of oxalic acid in ether to yield 74% of the oxalate; m.p. 194–6° C. A sample crystallized from 2-butanone melted at 212–3° C. Infrared spectra and chemical analysis confirmed the structure.

Example 3.—3 - (Dimethylcarbamoyl) - 8-[3-(4-fluorobenzoyl)propyl] - 4-oxo-1-phenyl-1,3,8-triazaspiro[4.5]decane Hydrochloride A mixture of 2.82 g. (0.009 mole) of 3-dimethylcarbamoyl) - 4 - oxo - 1-phenyl-1,3,8-triazaspiro[4.5]decane, 2.0 g. (0.01 mole) of γ-chloro-p-fluorobutyrophenone, 2.1 g. (0.02 mole) of sodium carbonate, a trace of potassium iodide and 45 ml. of 4-methyl-2-pentanone was stirred and heated at reflux for three days, cooled and washed with 25 ml. of water. The water layer was extracted with two 25 ml. portions of 2-butanone. The combined organic layers were dried with magnesium sulfate, filtered, and concentrated in vacuum to give 4.1 g. of a viscous oil. This was dissolved in 50 ml. of toluene and treated with dry hydrogen chloride and then with 200 ml. of ether to give 1.4 g. (31%) of product, m.p. 231.5–2.5° C. Infrared spectra and chemical analysis confirmed the structure.

The 3 - (dimethylcarbamoyl) - 4-oxo-1-phenyl-1,3,8-triazaspiro-[4.5]decade was prepared by the hydrogenolysis of a mixture of 8.3 g. (0.021 mole) of 8-benzyl-3-(dimethylcarbamoyl) - 4 - oxo - 1-phenyl-1,3,8-triazaspiro[4.5]decane, 0.8 g. of 5% Pd on carbon, and 150 ml. of ethanol in a Parr apparatus for 21 hours at 55 lbs./sq. inch. The slurry was filtered and concentrated in vacuum to give 6.4 g. of oil, which solidified on standing. The solid was crystallized from 125 ml. of methylcyclohexane to give 5.8 g. (92%) of the debenzylated product, m.p. 134.5–6.0° C. Infrared spectra and chemical analysis confirmed the structure.

The 8 - benzyl-3-(dimethylcarbamoyl)-4-oxo-1-phenyl-1,3,8-triazaspiro[4.5]decane was prepared by refluxing a stirred mixture of 12.8 g. (0.04 mole) of 8-benzyl-4-oxo-1 - phenyl - 1,3,8-triazaspiro[4.5]-decane, 1.9 g. (0.041 mole) of 50% sodium dispersion in paraffin and 100 ml. of benzene for 18 hours, then cooled to room temperature and treated slowly with 4.1 g. (0.04 mole) of dimethylcarbamoyl chloride. The slurry was stirred and heated at reflux for four hours, cooled, washed with two 25 ml. portions of water, dried with magnesium sulfate, filtered, and the filtrate concentrated by vacuum distillation to give a syrup. This was crystallized from 40 ml. of ethanol to give 0.8 g. of solid, m.p. 53–6° C. The mother liquor, on further cooling and standing, deposited 9.0 g. (57%) of the desired product, m.p. 123.0–4.5° C. Infrared spectra and chemical analysis confirmed its structure.

Example 4.—8 - [3 - (2-Thienyl)propyl]-4-oxo-3-(N,N-dimethylcarbamoyl) - 1 - phenyl-1,3,8-triazaspiro[4.5]decane Fumarate A mixture of 3.0 g. (0.01 mole) of 4-oxo-3-(N,N-dimethylcarbamoyl) - 1 - phenyl - 1,3,8 - triazaspiro[4.5]decane, 1.9 g. (0.01 mole) of γ-chlorobutyrothienone, 3.2 g. (0.03 mole) of sodium carbonate, and 0.1 g. of potassium iodide in 125 ml. of 4-methyl-2-pentanone was heated under reflux for 70 hours. The reaction mixture was cooled and filtered. The filtrate was washed twice with water and once with saturated sodium chloride solution, and was dried over anhydrous sodium sulfate. After filtering, the solution was evaporated in vacuo to yield 6.5 g. of orange oil. This was dissolved in 10 ml. of tetrahydrofuran, and the resulting solution added to a stirred solution of 1.2 g. of fumaric acid in 30 ml. of tetrahydrofuran. The resulting precipitate was recovered (3.5 g.) and crystallized from ethanol; m.p. 206–208.5° C.

*Anal.*—Calculated for $C_{28}H_{39}N_4O_7S$: C, 58.94; H, 6.01; N, 9.82. Found: C, 58.80; H, 6.25; N, 9.73.

4 - Oxo - 1-phenyl - 1,3,8-triazaspiro[4.5]decane.—A mixture of 28.9 g. (0.09 mole) of 8-benzyl-4-oxo-1-phenyl-1,3,8-triazaspiro[4.5]decane, 3.0 g. of 5% Pd on carbon, and 300 ml. of ethanol was hydrogenated in the usual manner to give 20.0 g. (96%) of the desired intermediate, m.p. 193–4° C.

Following the procedure of the previous examples the following compounds were prepared.

| Example | 8-Substituent | X | R′ | R″ |
|---|---|---|---|---|
| 5 | F—⟨phenyl⟩—C(=O)—CH₂CH₂CH₂— | C=O | —C₂H₅ | —C₂H₅ |
| 6 | F—⟨phenyl⟩—C(dioxolane)—CH₂CH₂Cl₂— | C=O | —C₂H₅ | —C₂H₅ |
| 7 | F—⟨phenyl⟩—S—CH₂CH₂CH₂— | C=O | —CH₃ | —CH₃ |
| 8 | F—⟨phenyl⟩—S—CH₂CH₂CH₂ | C=O | —C₂H₅ | —C₂H₅ |
| 9 | HC≡C—CH₂CH₂CH₂— | C=O | —CH₃ | —CH₃ |
| 10 | ⟨benzodioxole⟩—CH₂— | C=O | —CH₃ | —CH₃ |
| 11 | C₆H₅CH₂ | C=O | —CH₃ | —CH₃ |
| 12 | C₆H₅CH₂— | C=O | —C₂H₅ | —C₂H₅ |
| 13 | F—⟨phenyl⟩—C(=O)—CH₂CH₂CH₂— | C=S | —CH₃ | —CH₃ |

TABLE—Continued

| Example | 8-Substituent | X | R' | R'' |
|---|---|---|---|---|
| 14 | 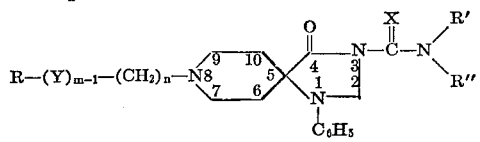 | C=S | —CH₃ | —CH₃ |
| 15 | 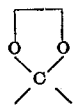-CH₂CH₂CH₂— | C=S | —CH₃ | —CH₃ |
| 16 | 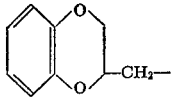 | C=S | —CH₃ | —CH₃ |

What is claimed is:

1. A compound of the formula

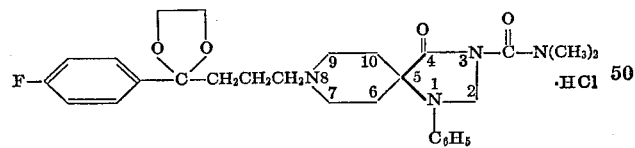

wherein R' and R'', which may be alike or different, represent alkyl hydrocarbon groups of 1 to 2 carbon atoms, and X is a chalcogen selected from the class consisting of oxygen and sulfur; $n$ is an integer from 0 to 3; $m$ is an integer of from 1 to 2; Y is an aliphatic divalent radical selected from the class consisting of >C=O, —S— and $$\begin{matrix} O & O \\ \diagdown & \diagup \\ & C \\ \diagup & \diagdown \end{matrix}$$

and R is selected from the class consisting of 4-fluorophenyl, 2-thienyl, phenyl, ethynyl and

[benzodioxane-CH₂—]

2. A compound of claim 1 having the formula:

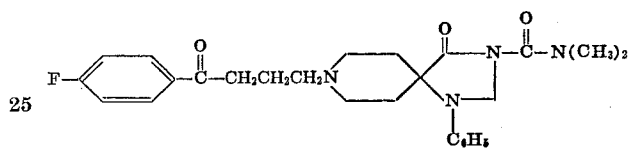

3. A compound of claim 1 having the formula:

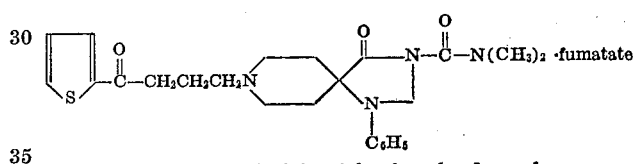

4. A compound of claim 1 having the formula:

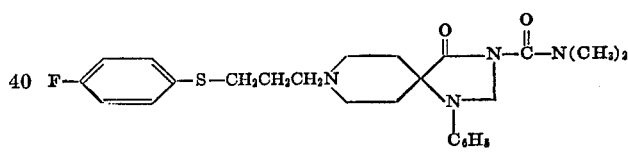

5. A compound of claim 1 having the formula:

F—⟨phenyl⟩—S—CH₂CH₂CH₂N... N—C—N(CH₃)₂
                                    C₆H₅

References Cited
UNITED STATES PATENTS
3,238,216  3/1966  Janssen ......... 260—94 AC X LELAND A. SEBASTIAN, Primary Examiner U.S. Cl. X.R.
260—999

UNITED STATES PATENT OFFICE
CERTIFICATE OF CORRECTION

Patent No. 3,839,342                    Dated October 1, 1974

Inventor(s) William George Scharpf

It is certified that error appears in the above-identified patent and that said Letters Patent are hereby corrected as shown below:

Column 5, line 42, "decade" should read --decane--.

Columns 5 & 6, Example 11, formula, "$C_6H_5CH_2$" should read --$C_6H_5CH_2-$ --.

*Signed and Sealed this*

*twenty-third* Day of *September 1975*

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

PATENT NO. : 3,839,342
DATED : October 1, 1974
INVENTOR(S) : William George Scharpf It is certified that error appears in the above-identified patent and that said Letters Patent are hereby corrected as shown below:

Column 3, line 68, reads "three hours", should read --three days--. (FMC error)

Signed and Sealed this twenty-seventh Day of April 1976

[SEAL]

Attest:

RUTH C. MASON
Attesting Officer

C. MARSHALL DANN
Commissioner of Patents and Trademarks